United States Patent

[11] 3,579,867

[72] Inventor Henry S. Kuhn
609 Austin Ave., Park Ridge, Ill. 60068
[21] Appl. No. 855,604
[22] Filed Sept. 5, 1969
[45] Patented May 25, 1971

[54] WRITING GUIDE FOR TRAINING PURPOSES AND USE BY THE BLIND
10 Claims, 6 Drawing Figs.
[52] U.S. Cl. .................................................... 35/38
[51] Int. Cl. .................................................. G09b 21/00
[50] Field of Search .......................................... 35/36, 37, 38

[56] References Cited
UNITED STATES PATENTS
1,371,430 3/1921 Nickerson .................... 35/38
1,372,360 3/1921 McNeill ....................... 35/38
FOREIGN PATENTS
483,443 4/1917 France ........................ 35/38
117,420 7/1918 Great Britain ............... 35/38

Primary Examiner—Wm. H. Grieb
Attorney—Hill, Sherman, Meroni, Gross and Simpson

ABSTRACT: A writing guide in the form of a generally planar board, the upper face of which forms the surface on which may be disposed the paper sheet to be written on, the board having a series of parallel edges extending horizontally across at least a portion of the upper face of the board, each of which defines respective writing lines along and above which the particular line is to be disposed, with each of such edges forming an abutment at the writing line defined thereby which faces upward toward the top of the board and is operative to impart a distinct resistance to movement of a writing instrument, applied to such a paper sheet, in a downward direction below such writing line. In a preferred embodiment of the invention the writing surface between each pair of adjacent abutment-forming edges is inclined from the inner boundary of the lowermost of such pair to the outer boundary of the uppermost of such pair. Such abutments may be placed in any desired configuration to define specific writing areas on the board and means is also provided for indicating margins as well as a designated line of writing.

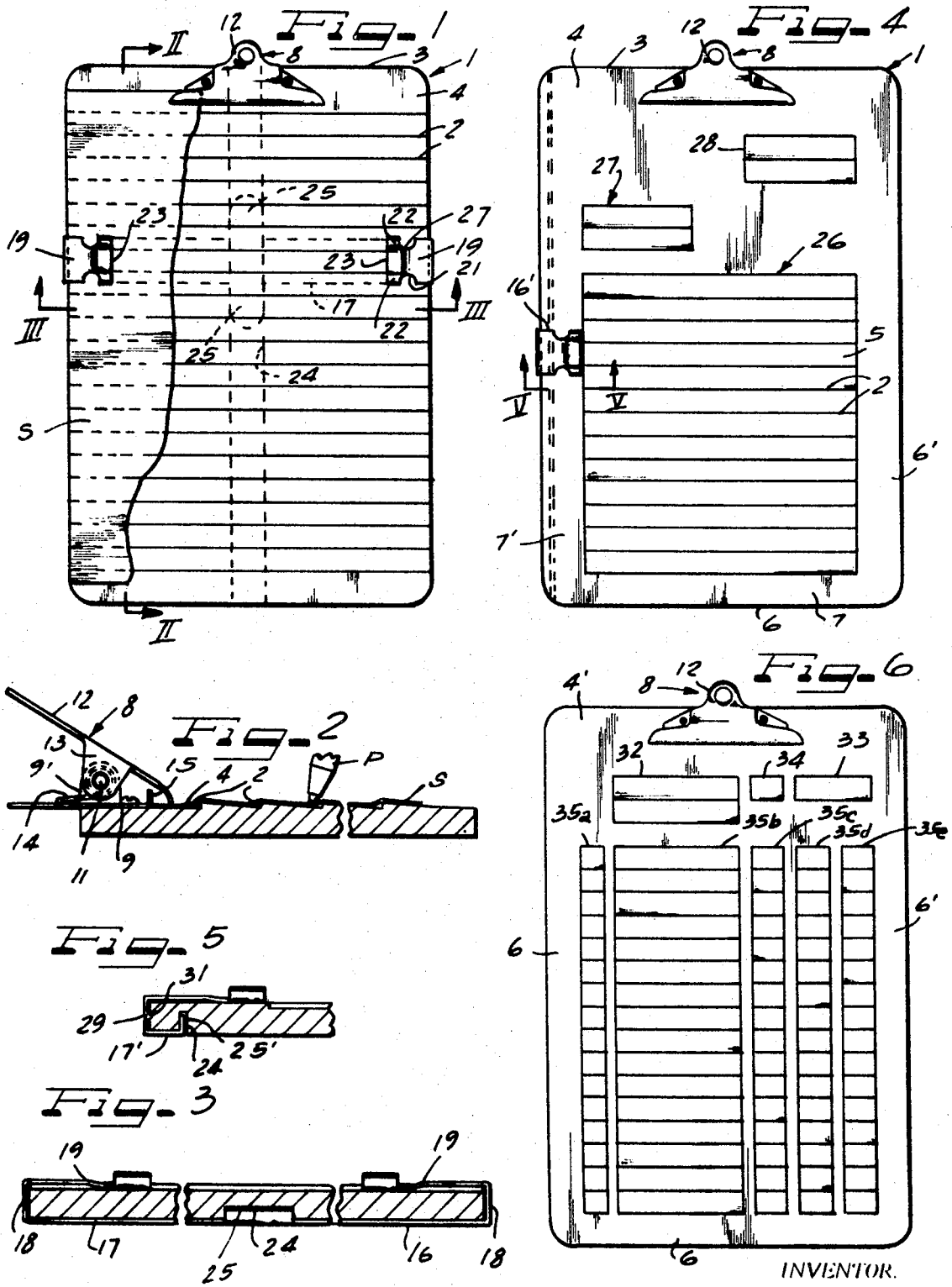

WRITING GUIDE FOR TRAINING PURPOSES AND USE BY THE BLIND

BACKGROUND OF THE INVENTION

The present invention is directed to a writing board or guide which is of particular importance as a writing aid for blind persons, as well as those who, for other reasons, have difficulty in writing on a straight line.

It will be appreciated that in the absence of sight, it is very difficult to write on a straight line or to uniformly space successive lines on a sheet of paper, as well as to achieve proper spacing of the components of the writing, as for example a letter, and maintain reasonably uniform margins at both sides of the writing sheet. Likewise it will be appreciated that while a person without sight may become proficient in writing reasonably well on a sheet of paper without any assisting guide means, if such person should discontinue the work for a while or otherwise lose the place, it would be exceedingly difficult to resume writing at the desired location without some means of indicating at least the location of the last written line. Likewise, in the training of children or mentally handicapped, the use of the present invention enables considerable improvement and overall proficiency in writing.

BRIEF SUMMARY OF INVENTION

The invention is directed to a guide structure in the form of a generally planar board of a size to receive a sheet of paper on which the writing is to be placed, the board having its upper surface formed with a series of edges forming abutments facing the upper or top edge of the board, the embodiment illustrated having substantially flat writing surfaces disposed between each adjacent pair of abutments which writing surfaces extend at an incline with respect to the general plane of the board with the inclination being directed toward the top or upper edge of the board whereby each edge forms an abutment at each writing line, and thereby defines the lower limits of the writing area for such line. The upper surface of the board thus may resemble a wall of lapped siding which is inverted with respect to the top edge of the board. Consequently, the abutments so formed will create or impart a resistance to a pen or pencil writing upon a sheet disposed on the board as the point of such writing instrument reaches the vicinity of such abutment, the amount of resistance depending upon the pressure exerted by the point of the writing instrument on the writing paper, i.e., the greater the pressure the greater the resistance.

In one form of the invention such guide abutments may extend clean across the board or the board may be designed for specific writings, as for example letters, invoices, statements and other similar communications and documents. In such arrangements only selected portions of the board may be provided with such abutments, the remaining portions of the board which are not to contain writing being left perfectly flat. As a result of this construction, the user may readily determine by touch the location of the various writing areas. Margins at the edges of the board may likewise be defined by flat sections and if desired both margins, as well as the location of the line actually being employed for writing, may be readily indicated by a suitable indicating member which is movable along one or both side edges of the board whereby the location of the indicator designates the particular line to be utilized for the writing while the lateral or transverse width of such indicator provides an accurate locating of the line margin at one or both side edges of the writing paper.

To insure accurate positioning and retention of the writing paper on the board during the writing operation, the board preferably is provided with a suitable spring bias clamp, or other means, preferably at the top of the board under which the paper may be slid and firmly retained in operative position.

BRIEF DESCRIPTION OF THE DRAWINGS

In the drawings, wherein like reference characters indicate like or corresponding parts, and wherein a preferred form of the invention is illustrated, which, as will be apparent therefrom and from the following description, may be capable of various immaterial variations and modifications without departing from the spirit and scope of the novel concepts of the disclosure:

FIG. 1 is a plan view of a writing guide constructed in accordance with the present invention;

FIG. 2 is a longitudinal section taken approximately on the line II–II of FIG. 1;

FIG. 3 is a transverse sectional view taken approximately on the line III–III of FIG. 1;

FIG. 4 is a plan view, similar to FIG. 1, illustrating a modified form of the invention;

FIG. 5 is a transverse sectional view taken approximately on the line V–V of FIG. 4; and FIG. 6 is a plan view similar to FIGS. 1 and 4 illustrating a further modification of the invention.

DETAILED DESCRIPTION OF THE INVENTION

Referring to FIGS. 1—3, the reference numeral 1 indicates generally a generally planar board or sheet having sufficient rigidity to permit its use as a supporting member for a paper sheet or other writing material. As clearly illustrated in FIG. 2, the upper face of the board is provided with a plurality of parallel edges 2, which in the embodiment illustrated extend horizontally across the board 1 and at substantially right angles to the general plane of the board forming abutments which face toward the top or upper edge 3 of the board, with the adjacent face of the board having a flat horizontally extending portion 4. As will be apparent from FIG. 2, each adjacent pair of abutments 2 define therebetween the area 5 to receive a line of writing. The lower edge 6 of the board is likewise provided with a flat horizontally extending portion 7.

To facilitate retention of a sheet of paper, such as the sheet S illustrated in FIG. 2, in proper position upon the board, the latter preferably is provided with paper retaining means, as for example, a clamp, indicated generally by the numeral 8, of common construction and used, for example, on clip boards and the like. Such clamp, in the embodiment illustrated comprises a base member 9, constructed of sheet metal having a pair of spaced upwardly extending ears 9' adapted to receive and support a pivot 10, 11 on which a movable clamp jaw 12 is pivotally supported, the latter having cooperable ears 13 through which the pin 11 passes, with the jaw 12 being biased in a clockwise direction as viewed in FIG. 2 by suitable means such as a torsion spring 14. As illustrated in FIG. 2 the base 8 may be provided with one or more upstanding flange portions 15 adapted to form a limiting stop for the paper sheet S when inserted under the jaw 12.

The surfaces defining the area 5 between each adjacent pair of edges 2 are illustrated as being substantially flat and are each inclined upwardly toward the top edge 4 whereby each of the areas 5 extend from the inner boundary of the lowermost edge of an adjacent pair to the outer boundary of the uppermost edge of such pair, whereby the construction resembles clapboard siding in an inverted position, i.e., the direction of inclination being reversed from top to bottom. Each of the abutments formed by the edges 2 are adapted to define a horizontal writing line with the area 5 directly thereabove adapted to receive the writing. As illustrated in FIG. 2, when normal pressure is applied by a writing instrument such as a pen P to the paper sheet S the latter will tend to conform to the configuration of the upper surface of the board at the specific writing area involved and as the writing implement is moved downwardly toward the adjacent abutment, the latter will eventually offer distinct resistance to further downward movement of the writing implement, thus imparting to the writer, solely by the sense of touch or feel, the information that the writing implement has reached the lower limit of the writing area. The proportions of the edges 2 and areas 5, as well as the inclination of the latter are such that a relatively normal writing surface is presented with the exception of the creation of the resistance previously mentioned. Likewise, the height of the abutments is selected to provide the desired amount of resistance, without otherwise affecting the writing operation.

In connection with the use of the board by blind persons, it has been found that writing proficiency rapidly increases and that no difficulties are experienced in producing a very neat, pleasing and acceptable letter or other writing, the person readily acquiring a sensitive feel to the guide line. However, the resistance imparted by such guide line may be readily overcome to enable the writing of a letter or other indicia below the guide line as well as above the same, as for example letters such as G, J, P, Y and Z.

In connection with the use of the device by individuals having sight, such individuals may readily keep track of the writing line involved, even though the writing operation may be discontinued for a period and subsequently resumed. Likewise, with sight the maintenance of suitable margins at each side edge of the paper is relatively easily achieved. However in the case of a blind person, while such person may readily keep track of the writing line and even maintain adequate margins, as the edge of the board will serve to some extent as a margin indicator, obviously, difficulties will arise if the board is laid down in the middle of a writing operation and subsequently picked up as the blind person then would have difficulty in ascertaining the last line written upon. To eliminate this problem, another feature of the invention resides in the provision of line indicating means which may also function as a margin indicator. Such indicating means may be provided along both side edges of the board, as illustrated in FIGS. 1 and 3, or may be provided along only one edge of the board as illustrated in FIGS. 4 and 5, as hereinafter discussed in detail.

In the embodiment illustrated in FIGS. 1 and 3, the indicating and margin defining member, indicated generally by the numeral 16, comprises an elongated strip 17 of sheet metal having the free end portions bent up around the side edges of the board as indicated at 18 and the free end portions 19 of the strip bent back substantially parallel with the general plane of the board. The portions 19 are provided with oppositely disposed notches 21 therein which define respective tabs 22 which are bent or curved upwardly to provide a generally arcuate configuration with the intermediate portion between the respective pairs of tabs seating upon one of the areas 5 of the board therebelow. The arcuate-shaped extreme end of the guide thus acts as a detent whereby the guide may be successively positioned in alignment with corresponding writing areas 5, tending to slightly snap into such position to insure an accurate identification of the writing line. At the same time the inner end edges 23 provide margin indicating means at both side edges of the board and thus of a writing paper thereon. To insure accurate transverse alignment of the portions 19, the bottom face of the board may be provided with a longitudinally extending slot 24 therein in which are disposed respective arms 25 carried by the strip 17 with the arms 25 thus functioning to eliminate a cocking action on the indicating structure, as for example, which might otherwise result by attempting to manually slide only one of the portions 19 along its cooperable edge of the board. Smooth movement of the indicating means along the board is thus assured.

FIG. 4 illustrates a guide board constructed to give an indication to the user of specific areas in which writing is to be inserted, the example illustrated being designed for use in letter writing. In this construction the board 1 is provided with a flat marginal strip 7' adjacent the bottom edge 6 of the board and similar side marginal strips 7 along the opposite side edges of the board. In this embodiment of the invention the main writing area, designated by the numeral 26, is constructed in the same manner as the construction of FIG. 1, with transversely extending edges 2 and intermediate writing areas 5 therebetween with the latter having the same cross-sectional configuration as the construction illustrated in FIGS. 1 and 2. The upper portion 4' of the board is likewise generally flat, with such portion and the marginal strips 7 and 7' lying substantially in a common plane. Additional writing areas or portions 27 and 28 are also provided, the area 27 being disposed, for example, to receive an address or a salutation, while the area 28 is disposed to receive a date, etc. Thus by disposition of the writing sheet or paper on the board of FIG. 4, the user may immediately determine, by the sense of touch, the proper locations of the address or salutation and the date, as well as the main writing area.

FIGS. 4 and 5 also illustrate a modified form of line indicating device which is provided only along the left-hand margin. The exposed portion of the indicating device 16' may be constructed in a manner identical to that of the construction illustrated in FIG. 1, the opposite end 17' of the device, however, being bent upwardly as indicated at 25' and disposed in a longitudinally extending slot 24'. Suitable detent means may be provided on the indicating structure, as for example, an inwardly extending protrusion 29 on the portion of the device extending along the edge of the board which is cooperable with any one of a series of suitably shaped recesses 31 disposed in the edge of the board and suitably aligned with the respective writing lines defined by the edges 2. Thus as the guide member is slid along the edge of the board, it may be readily oriented by feel with successive lines of writing. This type of structure could also be employed along the right-hand edge of the board of FIG. 4 if so desired.

The construction illustrated in FIG. 6 presents an arrangement suitable for use with columnar forms or the like, as for example, statements, invoices, etc., with individual areas 32, 33 and 34 being provided, for example, to receive an address, date and identifying number, etc. In like manner the main writing portion consists of a plurality of individual columns 35a, 35b, 35c, 35d and 35e disposed to receive various descriptive and identifying information as well as prices, etc., depending upon the particular form with which it is to be employed. Thus, the use of such a writing guide would for example, enable a blind person to accurately fill out forms, invoices, statements and other similar papers.

While the construction of FIG. 6 does not illustrate the use of line indicators such as illustrated in FIGS. 1 and 4, obviously if desired, such indicators may be employed with the construction of FIG. 6.

It will be appreciated from the above description that I have provided a writing guide of extreme simplicity which is substantially foolproof in use and offers substantially unlimited possibilities with respect to the layout of the writing areas whereby a sightless person may perform written operations that prior to the invention required sight for their performance.

It will also be appreciated that while the present invention is of great importance in assisting sightless persons to perform, in an efficient manner, various types of writing operations, the present invention also has considerable application as a training aid for small children, handicapped, mentally retarded, etc., to develop good writing habits as well as good letter formation, etc.

While the invention may adapt itself to other configurations with respect to the edges 2 and writing areas 5, that illustrated would appear to be preferable and to offer the greatest advantages both in usage and in fabrication.

I claim:

1. A writing guide comprising a generally planar board, the upper face of which forms the surface on which may be disposed the paper sheet to be written on, said board having sufficient rigidity to permit its use as a supporting member for such a paper sheet during writing operations thereon, the upper face of said board having a series of parallel edges, extending horizontally across at least the central portion of said board and defining respective writing lines, each of such edges forming an abutment at the writing line defined thereby,